No. 623,766. Patented Apr. 25, 1899.
J. F. CARROLL.
HOEING MACHINE.
(Application filed June 27, 1898.)
(No Model.) 2 Sheets—Sheet 1.
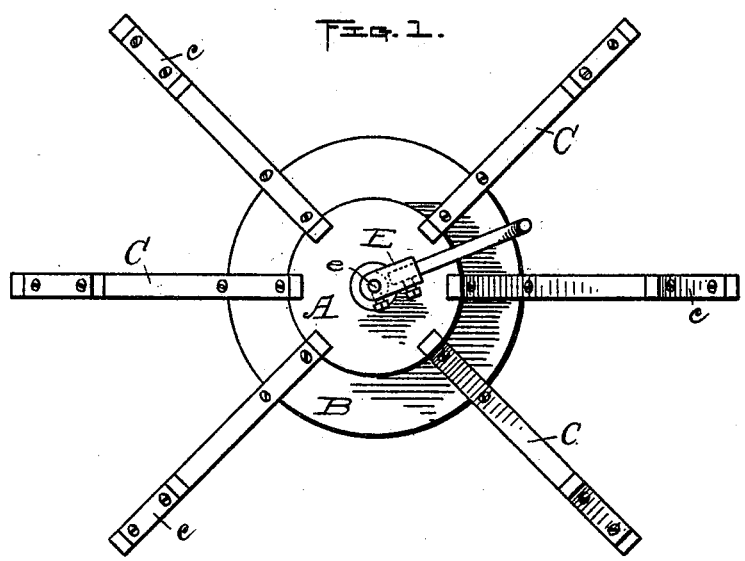
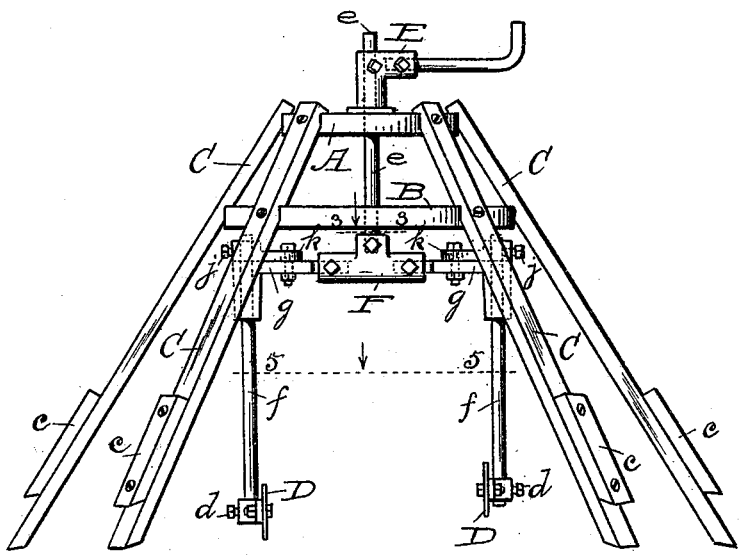

No. 623,766. Patented Apr. 25, 1899.
J. F. CARROLL.
HOEING MACHINE.
(Application filed June 27, 1898.)
(No Model.) 2 Sheets—Sheet 2.
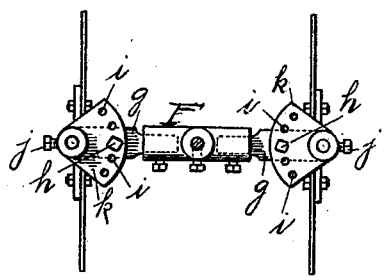
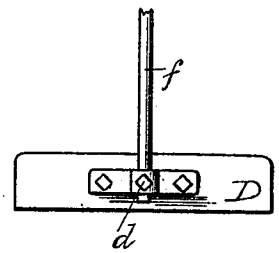
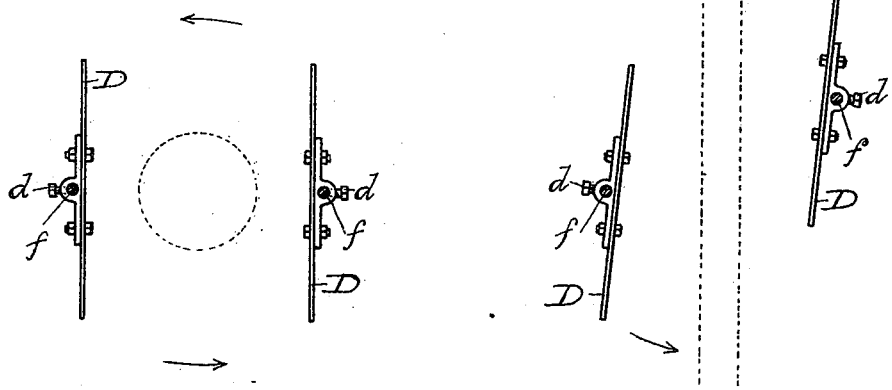
Witnesses,
C. Forrest Wesson.
M. E. Regan.
Inventor,
John F. Carroll.
By Southgate & Southgate Attys
THE NORRIS PETERS CO., PHOTO-LITHO., WASHINGTON, D. C.

UNITED STATES PATENT OFFICE.

JOHN F. CARROLL, OF WORCESTER, MASSACHUSETTS.

HOEING-MACHINE.

SPECIFICATION forming part of Letters Patent No. 623,766, dated April 25, 1899.

Application filed June 27, 1898. Serial No. 684,640. (No model.)

*To all whom it may concern:*

Be it known that I, JOHN F. CARROLL, a citizen of the United States, residing at Worcester, in the county of Worcester and State of Massachusetts, have invented a new and useful Hoeing-Machine, of which the following is a specification.

The object of my present invention is to provide a light, strong, simple, and efficient machine for cultivating vegetables, which machine has been especially designed for banking the earth about vegetables which are planted in hills, but which may also be employed for forming a trench or ditch between vegetables which are planted in rows.

To this end my invention consists of the parts and combinations of parts, as hereinafter described, and more particularly pointed out in the claims at the end of this specification.

In the accompanying two sheets of drawings, Figure 1 is a plan view of a hoeing-machine constructed according to my invention. Fig. 2 is a side view of the same. Fig. 3 is a detail sectional view taken on the line 3 3 of Fig. 2. Fig. 4 is a detail view of one of the hoeing-blades; and Figs. 5 and 6 are detail views taken on the line 5 5, illustrating the different relative positions to which the hoeing-blades may be set.

In cultivating growing vegetables it is now the usual custom to bank up the earth about the vegetables by hand. This is necessarily laborious, and, on the other hand, the use of traveling cultivators is objectionable, as the growing vegetables are liable to be hit or damaged thereby. The especial object of my present invention is therefore to provide a stationary hoeing-machine which may be set into position to bank the earth up against a hill of growing vegetables or which may be employed, if desired, for forming trenches between successive rows of vegetables. To these ends a hoeing-machine constructed according to my invention preferably comprises a framework, a vertical shaft journaled in said frame, one or more arms extending from said vertical shaft, and one or more hoeing-blades, which may be set at different relative angles with respect to their supporting-arms.

Referring to the drawings and in detail, the frame of a hoeing-machine constructed according to my invention, as herein illustrated, comprises disks or plates A and B, carried by inclined legs C. The inclined legs C are provided with stop-pieces $c$, which limit the depth to which said legs may be forced into the soil. Journaled in the plates A and B is a vertical shaft $e$, which may be turned or operated by a crank E. Secured on the lower end of the shaft $e$ is a socket-piece F, secured in which are supporting-arms $g$. Journaled in the supporting-arms $g$ are upright shafts $f$, which carry hoeing-blades D, secured in place thereon by set-screws $d$. Fastened on the upper ends of the shafts $f$ by means of set-screws $j$ are adjusting-pieces or sectors $k$. The adjusting-pieces or sectors $k$ are provided with a series of perforations $i$, so that the same may be clamped in different relative positions by means of bolts, as $h$, to hold the hoeing-blades at different relative angles with respect to the supporting-arms $g$.

In the operation of a hoeing-machine as thus constructed the frame of the machine is first placed in position over the vegetables which are to be cultivated. The hoeing-blades, by means of the connections above described, are set at the desired angle with respect to their supporting-arms $g$, and the vertical shaft may then be turned to bank the earth up in a hill about the vegetables being cultivated. The size of the hill which will be formed may be regulated by setting the hoeing-blades at different relative angles.

When a hoeing-machine constructed according to my invention is to be employed for cultivating vegetables planted in rows, the machine is set in such position that the hoeing-blades will stand on relatively opposite sides of a row, so that by oscillating the vertical shaft the soil may be forced in opposite directions, so that by then moving the machine along the row which is being cultivated a ditch or trench may thus be formed between successive rows of vegetables.

I am aware that changes may be made in the construction of my hoeing-machines by those who are skilled in the art without departing from the scope of my invention as expressed in the claims. I do not wish, therefore, to be limited to the form of construction which I have herein shown and described; but What I do claim, and desire to secure by Letters Patent of the United States, is—

1. In a hoeing-machine, the combination of a frame, a vertical shaft journaled therein, a supporting-arm extending from said vertical shaft, a hoeing-blade, and means for setting said hoeing-blade at different relative angles with respect to its supporting-arm, substantially as described.

2. In a hoeing-machine, the combination of a frame, a vertical shaft journaled therein, a plurality of supporting-arms extending from said vertical shaft, a hoeing-blade carried by each of said supporting-arms, and means for adjusting each of said hoeing-blades at different relative angles with respect to its supporting-arm, substantially as described.

3. In a hoeing-machine, the combination of a frame, a vertical shaft journaled therein, a supporting-arm extending from said shaft, a shaft journaled in the supporting-arm, a hoeing-blade secured on the lower end of said shaft, an adjusting-piece or sector secured on the upper end of said shaft, and means for clamping the adjusting-piece or sector in different positions to hold the hoeing-blade at different relative angles with respect to its supporting-arm, substantially as described.

4. In a hoeing-machine, the combination of a frame, a crank-actuated vertical shaft journaled therein, supporting-arms extending from opposite sides of the vertical shaft, shafts journaled in the supporting-arms, hoeing-blades secured on the lower end of said shafts, perforated sectors secured in the upper ends of the shafts, and bolts for clamping the perforated sectors in different positions to hold the hoeing-blades at different relative angles with respect to their supporting-arms, substantially as described.

5. In a hoeing-machine, the combination of a frame, comprising platforms A and B, and inclined legs C carrying stop-pieces c, a crank-actuated vertical shaft e journaled in said frame, a socket-piece F secured on the lower end of the shaft e and having supporting-arms g extending from opposite sides thereof, shafts f journaled in the supporting-arms, hoeing-blades D secured on the lower ends of the shafts f, perforated sectors k secured on the upper ends of the shafts f, and means for fastening the sectors k in different positions to hold the hoeing-blades at different relative angles with respect to their supporting-arms, substantially as described.

In witness whereof I hereto subscribe my name this 3d day of June, 1898.

JOHN F. CARROLL.

Witnesses:
HENRY W. KING,
M. L. POTTER.